United States Patent
Paolini et al.

(10) Patent No.: US 12,064,879 B2
(45) Date of Patent: *Aug. 20, 2024

(54) GLOBAL ARM PATH PLANNING WITH ROADMAPS AND PRECOMPUTED DOMAINS

(71) Applicant: Boston Dynamics, Inc., Waltham, MA (US)

(72) Inventors: Robert Eugene Paolini, Cambridge, MA (US); Alfred Anthony Rizzi, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,410

(22) Filed: Apr. 18, 2023

(65) Prior Publication Data

US 2023/0249346 A1     Aug. 10, 2023

Related U.S. Application Data

(63) Continuation of application No. 17/809,204, filed on Jun. 27, 2022, now Pat. No. 11,654,559, which is a
(Continued)

(51) Int. Cl.
*B25J 9/16*     (2006.01)
*B25J 9/04*     (2006.01)

(52) U.S. Cl.
CPC .......... *B25J 9/1664* (2013.01); *B25J 9/042* (2013.01); *B25J 9/161* (2013.01)

(58) Field of Classification Search
CPC . B25J 9/1664; B25J 9/042; B25J 9/161; B25J 9/163
(Continued)

(56) References Cited

U.S. PATENT DOCUMENTS 5,544,282 A    8/1996   Chen et al.
6,004,016 A   12/1999   Spector
(Continued)

FOREIGN PATENT DOCUMENTS

JP    2000020117 A    1/2000
KR    20170050166 A    5/2017

OTHER PUBLICATIONS

Akbari et al., Dynamically Stable 3D Quadrupedal Walking with Multi-Domain Hybrid System Models and Virtual Constraint Controllers; 2019, IEEE, American Control Conference (ACC) Philadelphia, PA, USA, Jul. 10-12, 2019,pp. 4588-4595, doi: 10.23919/ACC.2019.8815085. (Year: 2019).

(Continued)

*Primary Examiner* — Jaime Figueroa
(74) *Attorney, Agent, or Firm* — Knobbe, Martens, Olson & Bear, LLP

(57) ABSTRACT

A method of planning a path for an articulated arm of robot includes generating a directed graph corresponding to a joint space of the articulated arm. The directed graph includes a plurality of nodes each corresponding to a joint pose of the articulated arm. The method also includes generating a planned path from a start node associated with a start pose of the articulated arm to an end node associated with a target pose of the articulated arm. The planned path includes a series of movements along the nodes between the start node and the end node. The method also includes determining when the articulated arm can travel to a subsequent node or the target pose, terminating a movement of the articulated arm towards a target node, and initiating a subsequent movement of the articulated arm to move directly to the target pose or the subsequent node.

20 Claims, 12 Drawing Sheets

Related U.S. Application Data continuation of application No. 16/877,699, filed on May 19, 2020, now Pat. No. 11,407,109.

(60) Provisional application No. 63/011,020, filed on Apr. 16, 2020.

(58) Field of Classification Search
USPC .............. 700/245–264; 318/568.11–568.25
See application file for complete search history.

(56) References Cited

U.S. PATENT DOCUMENTS

| | | | |
|---|---|---|---|
| 6,588,701 B2 | 7/2003 | Yavnai | |
| 7,386,364 B2 | 6/2008 | Mikami et al. | |
| 8,116,908 B2 | 2/2012 | Ng-Thow-Hing et al. | |
| 8,160,745 B2 | 4/2012 | Sugiura | |
| 8,350,861 B2 | 1/2013 | Lee et al. | |
| 8,483,874 B2 | 7/2013 | Kim et al. | |
| 8,818,555 B2 | 8/2014 | Kim et al. | |
| 8,825,209 B2 | 9/2014 | Kim et al. | |
| 8,924,016 B2 | 12/2014 | Kim et al. | |
| 9,031,691 B2 | 5/2015 | Yamane | |
| 9,044,862 B2 | 6/2015 | Kim et al. | |
| 9,395,726 B1* | 7/2016 | Rizzi | B62D 57/032 |
| 9,411,335 B2 | 8/2016 | Kim et al. | |
| 9,499,218 B1* | 11/2016 | Stephens | G05D 1/0891 |
| 9,586,316 B1 | 3/2017 | Swilling | |
| 9,594,377 B1 | 3/2017 | Perkins et al. | |
| 9,849,926 B2* | 12/2017 | Saunders | B25J 9/1612 |
| 9,868,210 B1* | 1/2018 | Whitman | B62D 57/032 |
| 9,981,389 B2 | 5/2018 | Kennedy et al. | |
| 10,059,392 B1* | 8/2018 | Fay | B62D 57/032 |
| 10,081,098 B1 | 9/2018 | Nelson et al. | |
| 10,081,104 B1 | 9/2018 | Swilling | |
| 10,124,488 B2 | 11/2018 | Lee et al. | |
| 10,239,208 B1 | 3/2019 | Swilling | |
| 10,246,151 B1* | 4/2019 | Stephens | G05D 1/0891 |
| 10,248,085 B2 | 4/2019 | Ha et al. | |
| 10,456,916 B2 | 10/2019 | Swilling | |
| 10,528,051 B1 | 1/2020 | Perkins et al. | |
| 11,027,415 B1 | 6/2021 | Nelson et al. | |
| 11,045,958 B2 | 6/2021 | Bowling et al. | |
| 11,188,081 B2 | 11/2021 | Perkins et al. | |
| 11,235,465 B2 | 2/2022 | Sorin et al. | |
| 11,247,738 B2 | 2/2022 | Lavalley et al. | |
| 11,225,294 B1 | 6/2022 | Stephens | |
| 11,407,109 B2 | 8/2022 | Paolini et al. | |
| 11,413,750 B2 | 8/2022 | Swilling | |
| 11,471,232 B2 | 10/2022 | Bowling et al. | |
| 11,654,559 B2 | 5/2023 | Paolini et al. | |
| 2002/0060267 A1 | 5/2002 | Yavnai | |
| 2005/0055131 A1 | 3/2005 | Mikami et al. | |
| 2005/0228539 A1 | 10/2005 | Takenaka et al. | |
| 2007/0013506 A1 | 1/2007 | Takenaka et al. | |
| 2010/0277483 A1 | 11/2010 | Lee et al. | |
| 2011/0035087 A1 | 2/2011 | Kim et al. | |
| 2011/0231050 A1 | 9/2011 | Goulding | |
| 2013/0231822 A1* | 9/2013 | Gouaillier | G05D 1/021 901/1 |
| 2013/0238183 A1 | 9/2013 | Goulding | |
| 2014/0121833 A1 | 5/2014 | Lee et al. | |
| 2014/0249670 A1 | 9/2014 | Yamane | |
| 2016/0008988 A1 | 1/2016 | Kennedy et al. | |
| 2018/0107175 A1 | 4/2018 | Ha et al. | |
| 2020/0259896 A1 | 8/2020 | Sachs et al. | |
| 2020/0369333 A1 | 11/2020 | Lavalley et al. | |

OTHER PUBLICATIONS

Desai et al. Geppetto: Enabling Semantic Design of Expressive Robot Behaviors; 2019, ACM Digital Library, CHI '19: Proceedings of the 2019 CHI Conference on Human Factors in Computing Systems, May 2019, Paper No. 369, pp. 1-14, https://doi.org/10.1145/3290605.3300599 (Year: 2019).

* cited by examiner

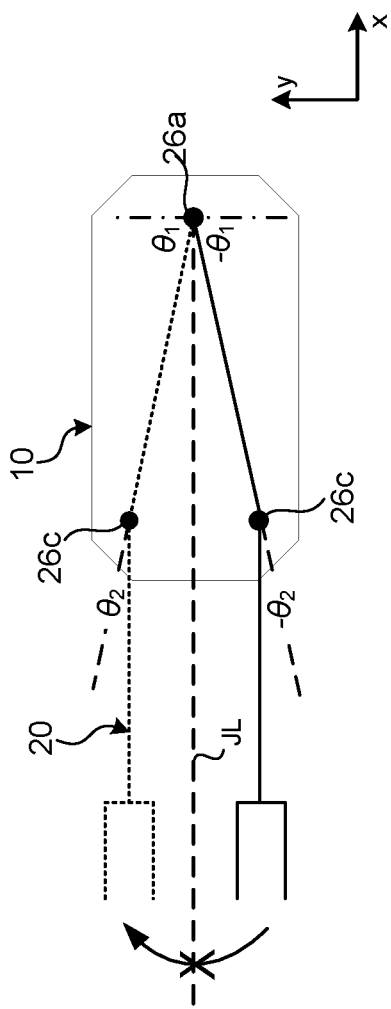
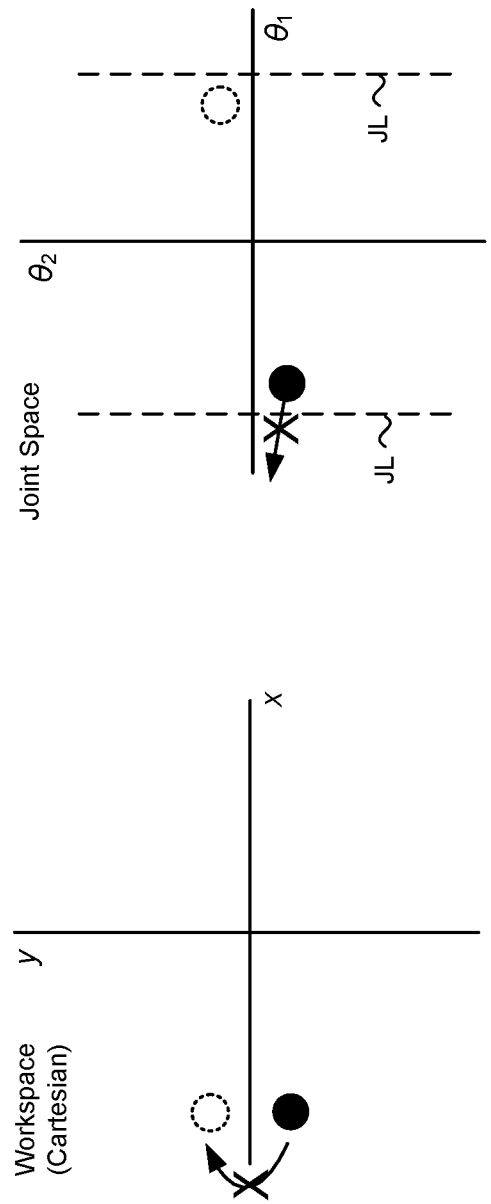
FIG. 3A
FIG. 3B
FIG. 3C

GLOBAL ARM PATH PLANNING WITH ROADMAPS AND PRECOMPUTED DOMAINS

CROSS REFERENCE TO RELATED APPLICATIONS

This application is a continuation of U.S. application Ser. No. 17/809,204, filed Jun. 27, 2022 and titled "GLOBAL ARM PATH PLANNING WITH ROADMAPS AND PRE-COMPUTED DOMAINS," which is a continuation of U.S. application Ser. No. 16/877,699, filed May 19, 2020 and titled "GLOBAL ARM PATH PLANNING WITH ROADMAPS AND PRECOMPUTED DOMAINS," which claims the benefit of priority under 35 U.S.C. § 119 of U.S. Provisional Patent Application No. 63/011,020, filed Apr. 16, 2020 and titled "GLOBAL ARM PATH PLANNING WITH ROADMAPS AND PRECOMPUTED DOMAINS," each of which is herein incorporated by reference in its entirety.

TECHNICAL FIELD

This disclosure relates to global arm path planning of a robot using roadmaps and precomputed domains.

BACKGROUND

Robotic arms are increasingly being used in constrained or otherwise restricted environments to perform a variety of tasks or functions. These robotic arms often need to efficiently navigate through these constrained environments without reaching joint limits or striking physical obstacles within the environment. As robotic arms become more prevalent, there is a need for arm path planning that provides a complete and optimal path while maintaining speed.

SUMMARY

One aspect of the disclosure provides a method of planning a path for an articulated arm of a robot. The method includes generating, by data processing hardware of a robot having an articulated arm, a graph corresponding to a joint space of the articulated arm. The graph includes a plurality of nodes, where each node corresponds to a joint pose of the articulated arm. The method also includes generating, by the data processing hardware, a planned path from a start node associated with a start pose of the articulated arm to an end node associated with a target pose of the articulated arm, the planned path including a series of movements along the plurality of the nodes between the start node and the end node. The method also includes simulating, by the data processing hardware, a movement of the articulated arm along the planned path towards a target node. The method also includes, while simulating the movement of the articulated arm towards the target node of the planned path, (a) determining, by the data processing hardware, whether the articulated arm can travel directly to one of the target pose or a subsequent node positioned along the planned path between the target node and the end node, and (b) when the articulated arm can travel directly to the target pose or the subsequent node, terminating, by the data processing hardware, the movement of the articulated arm towards the target node and initiating a subsequent movement of the articulated arm to move directly to the one of the target pose or the subsequent node.

Implementations of the disclosure may include one or more of the following optional features. In some implementations the method includes computing, by the data processing hardware, an outer domain for each of the nodes of the graph. Optionally, determining whether the articulated arm can travel directly to a subsequent node of the planned path includes determining whether the articulated arm is within a subsequent outer domain of one or more subsequent nodes of the planned path.

In some implementations, the method includes computing, by the data processing hardware, an inner domain corresponding to each outer domain. Here, computing the inner domain comprises inwardly offsetting a boundary of the inner domain from a boundary of the corresponding outer domain by a threshold distance. Optionally, the method further comprises, for each node of the plurality of nodes of the graph, computing, by the data processing hardware, a corresponding outer domain and/or a corresponding inner domain using a classifier trained on a training data set of simulated joint angle configurations, where the simulated joint configurations include successful joint angle configurations and failed joint angle configurations.

In some examples, the method includes selecting by the data processing hardware, the start node of the planned path associated with the start pose of the articulated arm and the end node associated with the target pose of the articulated arm. Here, the start node is a node of the graph that is closest to the start pose and the end node is a node of the graph that is closest to the target pose.

In some implementations, the graph further includes a plurality of edges each extending between a respective pair of nodes among the plurality of nodes. Each edge corresponds to a distance the articulated arm will travel from a first one of the nodes in the respective pair of nodes to a second one of the nodes in the respective pair of nodes. Here, generating the planned path includes generating a plurality of candidate planned paths from the start node to the end node, each candidate planned path comprising a corresponding series of movements along the plurality of the nodes via the edges. In some examples, the method includes, for each candidate planned path, determining, by the data processing hardware, a total distance the articulated arm will travel from the start node to the end node based on the edges of the corresponding planned path. Here, the method includes selecting, by the data processing hardware, one of the plurality of the candidate planned paths based on the total distances the articulated arm will travel from the start node to the end node.

Another aspect of the disclosure provides a system for controlling movement of an articulated arm of a robot. The system includes data processing hardware and memory hardware in communication with the data processing hardware. The memory hardware stores instructions that when executed on the data processing hardware cause the data processing hardware to perform operations. The operations includes generating a graph corresponding to a joint space of the articulated arm. The graph includes a plurality of nodes, where each node corresponds to a joint pose of the articulated arm. The operations also include generating a planned path from a start node associated with a start pose of the articulated arm to an end node associated with a target pose of the articulated arm, the planned path including a series of movements along the plurality of the nodes between the start node and the end node. The operations also include simulating a movement of the articulated arm along the planned path towards a target node. The operations also include, while simulating the movement of the articulated arm towards the target node of the planned path, (a) determining whether the articulated arm can travel directly to one of the target pose or a subsequent node positioned along the planned path between the target node and the end node, and (b) when the articulated arm can travel directly to the target pose or the subsequent node, terminating the movement of the articulated arm towards the target node and initiating a subsequent movement of the articulated arm to move directly to the one of the target pose or the subsequent node.

Implementations of the disclosure may include one or more of the following optional features. In some implementations the operations include computing an outer domain for each of the nodes of the graph. Optionally, determining whether the articulated arm can travel directly to a subsequent node of the planned path includes determining whether the articulated arm is within a subsequent outer domain of one or more subsequent nodes of the planned path.

In some implementations, the operations include computing an inner domain corresponding to each outer domain. Here, computing the inner domain comprises inwardly offsetting a boundary of the inner domain from a boundary of the corresponding outer domain by a threshold distance. Optionally, the operations further include, for each node of the plurality of nodes of the graph, computing, by the data processing hardware, a corresponding outer domain and/or a corresponding inner domain using a classifier trained on a training data set of simulated joint angle configurations, where the simulated joint configurations include successful joint angle configurations and failed joint angle configurations.

In some examples, the operations include selecting the start node of the planned path associated with the start pose of the articulated arm and the end node associated with the target pose of the articulated arm. Here, the start node is a node of the graph that is closest to the start pose and the end node is a node of the graph that is closest to the target pose.

In some implementations, the graph further includes a plurality of edges each extending between a respective pair of nodes among the plurality of nodes. Each edge corresponds to a distance the articulated arm will travel from a first one of the nodes in the respective pair of nodes to a second one of the nodes in the respective pair of nodes. Here, generating the planned path includes generating a plurality of candidate planned paths from the start node to the end node, each candidate planned path comprising a corresponding series of movements along the plurality of the nodes via the edges. In some examples, the operations include, for each candidate planned path, determining a total distance the articulated arm will travel from the start node to the end node based on the edges of the corresponding planned path. Here, the operations include selecting one of the plurality of the candidate planned paths based on the total distances the articulated arm will travel from the start node to the end node.

Another aspect of the disclosure provides a robot having an articulated arm configured to maneuver about an environment. The system includes data processing hardware in communication with the articulated arm and memory hardware in communication with the data processing hardware. The memory hardware stores instructions that when executed on the data processing hardware cause the data processing hardware to perform operations. The operations includes generating a graph corresponding to a joint space of the articulated arm. The graph includes a plurality of nodes, where each node corresponds to a joint pose of the articulated arm. The operations also include generating a planned path from a start node associated with a start pose of the articulated arm to an end node associated with a target pose of the articulated arm, the planned path including a series of movements along the plurality of the nodes between the start node and the end node. The operations also include simulating a movement of the articulated arm along the planned path towards a target node. The operations also include, while simulating the movement of the articulated arm towards the target node of the planned path, (a) determining whether the articulated arm can travel directly to one of the target pose or a subsequent node positioned along the planned path between the target node and the end node, and (b) when the articulated arm can travel directly to the target pose or the subsequent node, terminating the movement of the articulated arm towards the target node and initiating a subsequent movement of the articulated arm to move directly to the one of the target pose or the subsequent node.

This aspect may include one or more of the following optional features. In some implementations the operations include computing an outer domain for each of the nodes of the graph. Optionally, determining whether the articulated arm can travel directly to a subsequent node of the planned path includes determining whether the articulated arm is within a subsequent outer domain of one or more subsequent nodes of the planned path.

In some implementations, the operations include computing an inner domain corresponding to each outer domain. Here, computing the inner domain comprises inwardly offsetting a boundary of the inner domain from a boundary of the corresponding outer domain by a threshold distance. Optionally, the operations further include, for each node of the plurality of nodes of the graph, computing, by the data processing hardware, a corresponding outer domain and/or a corresponding inner domain using a classifier trained on a training data set of simulated joint angle configurations, where the simulated joint configurations include successful joint angle configurations and failed joint angle configurations.

In some examples, the operations include selecting the start node of the planned path associated with the start pose of the articulated arm and the end node associated with the target pose of the articulated arm. Here, the start node is a node of the graph that is closest to the start pose and the end node is a node of the graph that is closest to the target pose.

In some implementations, the graph further includes a plurality of edges each extending between a respective pair of nodes among the plurality of nodes. Each edge corresponds to a distance the articulated arm will travel from a first one of the nodes in the respective pair of nodes to a second one of the nodes in the respective pair of nodes. Here, generating the planned path includes generating a plurality of candidate planned paths from the start node to the end node, each candidate planned path comprising a corresponding series of movements along the plurality of the nodes via the edges. In some examples, the operations include, for each candidate planned path, determining a total distance the articulated arm will travel from the start node to the end node based on the edges of the corresponding planned path. Here, the operations include selecting one of the plurality of the candidate planned paths based on the total distances the articulated arm will travel from the start node to the end node.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3A is a schematic view of an example trajectory of an arm of a robot from a first position to a second position, where the arm is prevented from traveling directly from the first position to the second position.

FIG. 3B is a plot showing the first position and the second position of FIG. 3A represented in a Cartesian workspace.

FIG. 3C is a plot showing the first position and the second position of FIG. 3A represented in a joint space.

Like reference symbols in the various drawings indicate like elements.

DETAILED DESCRIPTION

Many robots include multi-axis articulable appendages configured to execute complex movements for completing tasks, such as material handling or industrial operations (e.g., welding, gluing, and/or fastening). These appendages, also referred to as manipulators, typically include an end-effector or hand attached at the end of a series appendage segments or portions, which are connected to each other by one or more appendage joints. The appendage joints cooperate to configure the appendage in a variety of poses within a space associated with the robot. Here, the term "pose" refers to the position and orientation of the appendage. For example, the pose of the appendage may be defined by coordinates (x, y, z) of the appendage within a workspace (Cartesian space), and the orientation may be defined by angles (Ox, Oy, Oz) of the appendage within the workspace. In use, movements of the robot appendage directly between poses may be restricted by physical joint limits, singularities (i.e., where the appendage loses one or more degree of freedom), and/or physical obstructions between the appendage poses.

Figure 1:
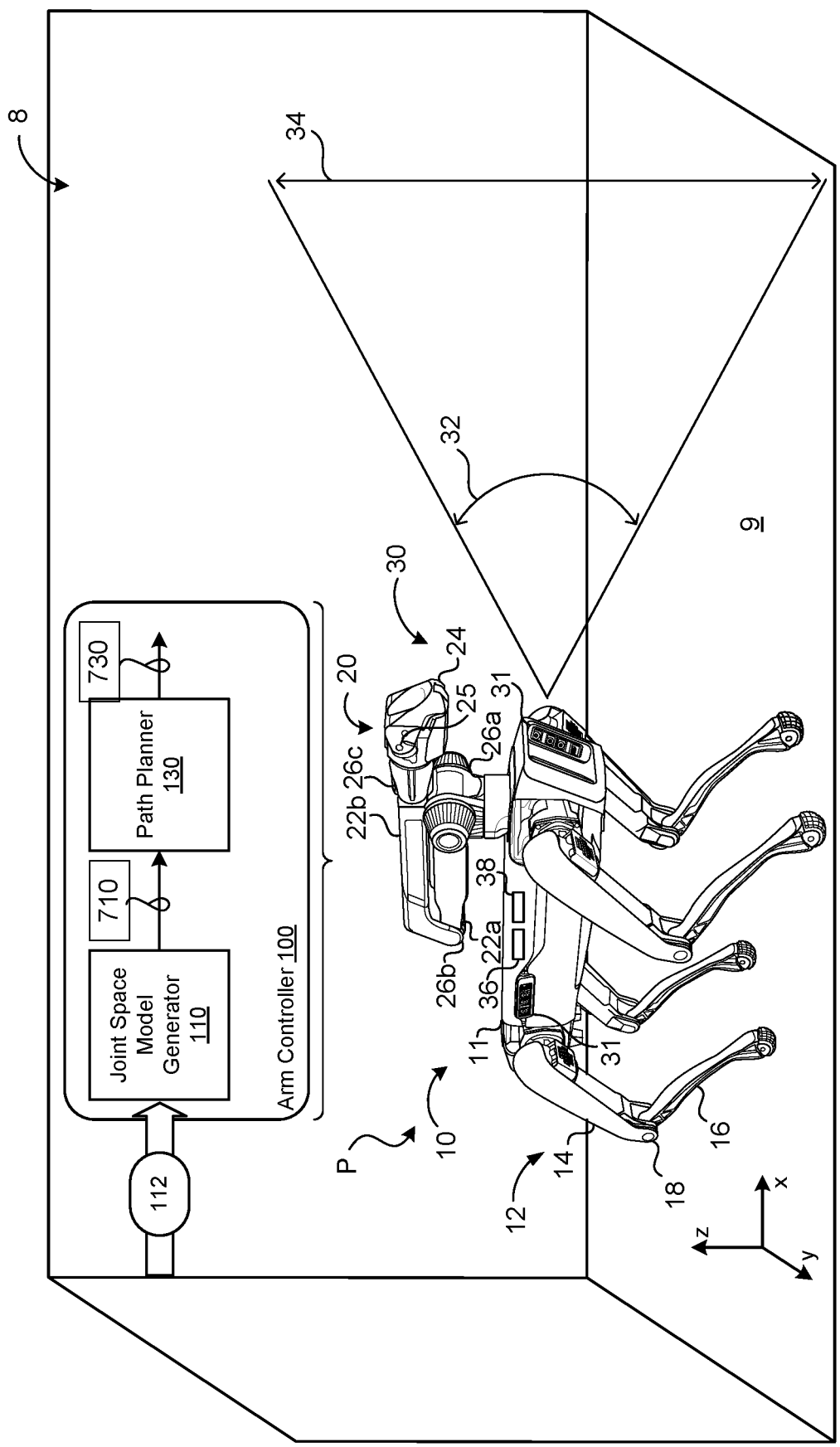
FIG. 1 is a schematic view of an example robot executing an arm path planner for planning a trajectory of an arm of a robot.

Referring to FIG. 1, a robot or robotic device 10 includes a body 11 and two or more legs 12. Each leg 12 is coupled to the body 11 and may have an upper portion 14 and a lower portion 16 separated by a leg joint 18. In some implementations, the robot 10 further includes one or more appendages, such as an articulated arm 20 or manipulator disposed on the body 11 and configured to move relative to the body 11. Moreover, the articulated arm 20 may be interchangeably referred to as a manipulator, an appendage arm, or simply an appendage. In the example shown, the articulated arm 20 includes two arm portions 22, 22a, 22b rotatable relative to one another and the body 11. However, the articulated arm 20 may include more or less arm portions 22 without departing from the scope of the present disclosure. A third arm portion 24 of the articulated arm, referred to as an end effector 24 or hand 24, may be interchangeably coupled to a distal end of the second portion 22b of the articulated arm 20 and may include one or more actuators 25 for gripping/grasping objects.

The articulated arm 20 includes a plurality of joints 26, 26a-26c disposed between adjacent ones of the arm portions 22, 24. In the illustrated example, the first arm portion 22a is attached to the body 11 of the robot 10 by a first two-axis joint 26a, referred to as a shoulder 26a. A single-axis joint 26b connects the first arm portion 22a to the second arm portion 22b. The second joint 26b includes a single axis of rotation and may be interchangeably referred to as the elbow 26b of the articulated arm 20. A second two axis joint 26c connects the second arm portion 22b to the hand 24, and may be interchangeably referred to as the wrist 26c of the articulated arm 20. Accordingly, the joints 26 cooperate to provide the articulated arm 20 with five degrees of freedom (i.e., five axes of rotation). While the illustrated example shows a five-axis articulated arm 20, the principles of the present disclosure are applicable to robotic arms having any number of degrees of freedom.

The robot 10 also includes a vision system 30 with at least one imaging sensor or camera 31, each sensor or camera 31 capturing image data or sensor data 17 of the environment 8 surrounding the robot 10 with an angle of view 32 and within a field of view 34. The vision system 30 may be configured to move the field of view 34 by adjusting the angle of view 32 or by panning and/or tilting (either independently or via the robot 10) the camera 31 to move the field of view 34 in any direction. Alternatively, the vision system 30 may include multiple sensors or cameras 31 such that the vision system 30 captures a generally 360-degree field of view around the robot 10. The camera(s) 31 of the vision system 30, in some implementations, include one or more stereo cameras (e.g., one or more RGBD stereo cameras). In other examples, the vision system 30 includes one or more radar sensors such as a scanning light-detection and ranging (LIDAR) sensor, or a scanning laser-detection and ranging (LADAR) sensor, a light scanner, a time-of-flight sensor, or any other three-dimensional (3D) volumetric image sensor (or any such combination of sensors). The vision system 30 provides image data or sensor data 17 derived from image data captured by the cameras or sensors 31 to the data processing hardware 36 of the robot 10. The data processing hardware 36 is in digital communication with memory hardware 38 and, in some implementations, may be a remote system. The remote system may be a single computer, multiple computers, or a distributed system (e.g., a cloud environment) having scalable/elastic computing resources and/or storage resources.

Figure 6:
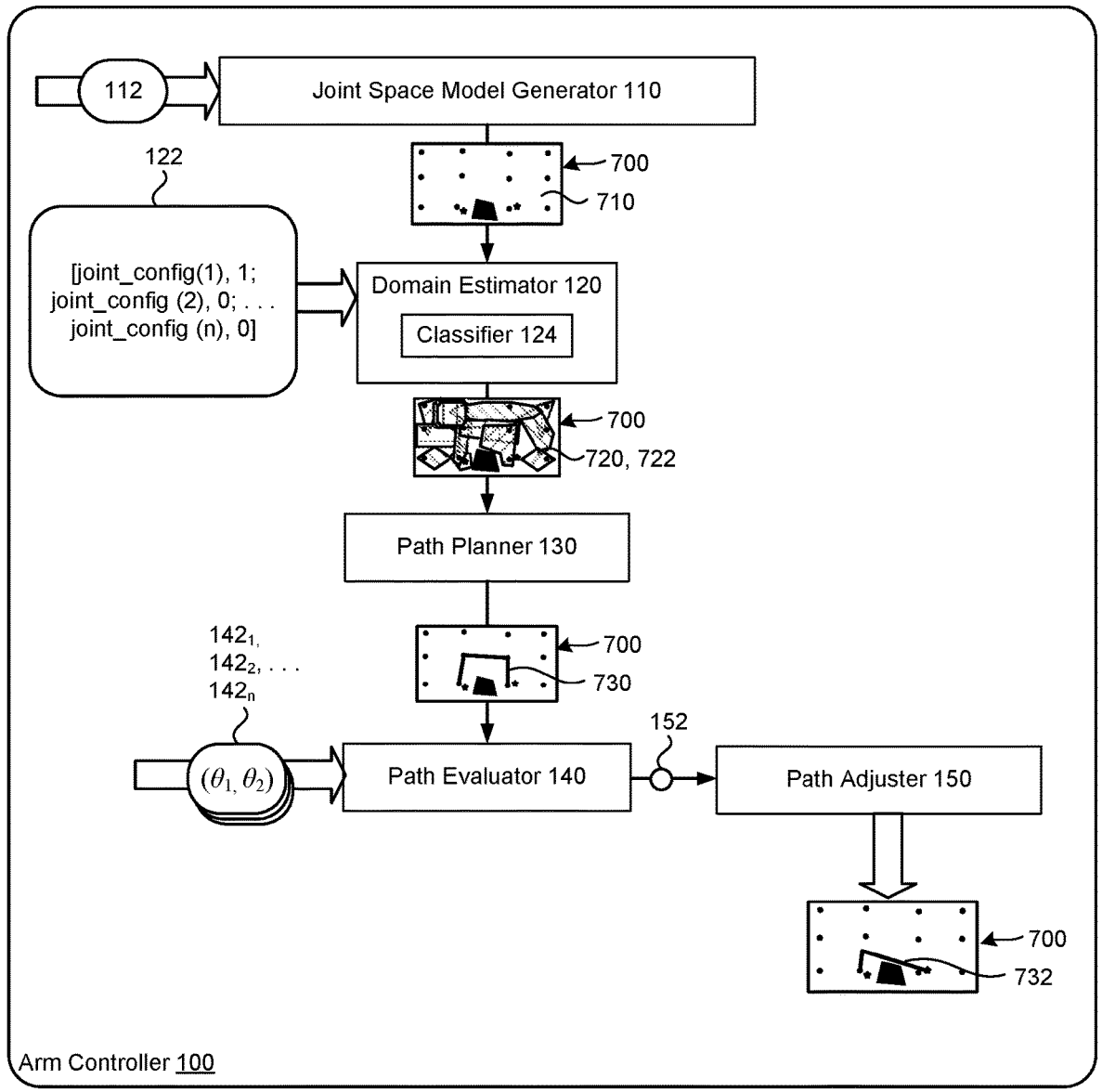
FIG. 6 is a schematic view of the arm path planner of the robot executing the method of FIG. 5.

An arm controller 100 of the robot 10 controls moving the articulated arm 20 between poses. For instance, the articulated arm 20 may need to move from a start pose to a target pose when the robot 10 is performing a specific action. For instance, in a scenario when the robot 10 needs to open a door while navigating in an environment, the robot controller 100 will need to move the articulated arm 20 from a retracted pose to a target pose where the articulated arm 20 positions the end effector 24 to manipulate a door knob to open the door. The arm controller 100 may include a joint space model generator 110 and a path planner 130. The joint space model generator 110 is configured to receive environmental characteristic data 112 associated with the articulated arm 20 and generate a model 710 representing a joint space 700 (FIG. 6) of the articulated arm 20. The environmental characteristic data 112 may include identified obstacles within the environment 8, geometries of the robot, and geometries of the articulated arm 20. Using the model 710 of the joint space 700, the path planner 130 determines a planned path 730 (FIG. 6) through the joint space 700 from the start pose to the target pose. The arm controller 100 may use the planned path 730 for controlling the actuators 25 to move the articulated arm 20 along the planned path 730 to reach the target pose. Unlike conventional systems, which may sequentially move the articulated arm 20 along a series of nodes of the planned path 730, the arm controller 100 may continuously evaluate and adjust the planned path 730 to reduce the time it takes for the articulated arm 20 to reach the target pose.

In the illustrated example, the robot 10 executes the arm controller 100 on the data processing hardware 36 of the robot. In some implementations, at least a portion of the arm controller 100 executes on a remote device in communication with the robot 10. For instance, the model of the joint space may be computed on a remote device and a control system executing on the robot 10 may receive the model and determine and execute the movements along the planned path. Optionally, the arm controller 100 may execute on a remote device and the remote device may control/instruct the robot 10 to move the articulated arm 20.

As provided above, movements and poses of the robot appendage may be defined in terms of a robot workspace based on a Cartesian coordinate system. Alternatively, movements and poses of the robot appendage 20 may be described with respect to a joint space of the robot appendage. As used herein, a joint space for a robot appendage refers to a space representing all possible combinations of joint configurations of a robot appendage, and is directly related to the number of degrees of freedom of the robot appendage. For instance, a robot arm having n degrees of freedom will have an n-dimensional joint space. In the example of the robot 10 provided in FIG. 1, the articulated arm 20 has five degrees of freedom, and hence, a five-dimensional joint space.

Figure 2C:
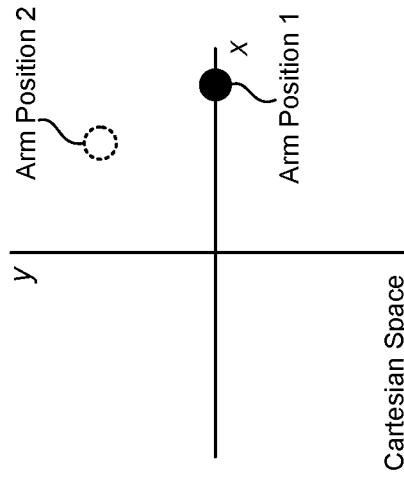
FIG. 2C is a plot showing the first position of FIG. 2A and the second position of FIG. 2B represented in a Cartesian workspace.
Figure 2D:
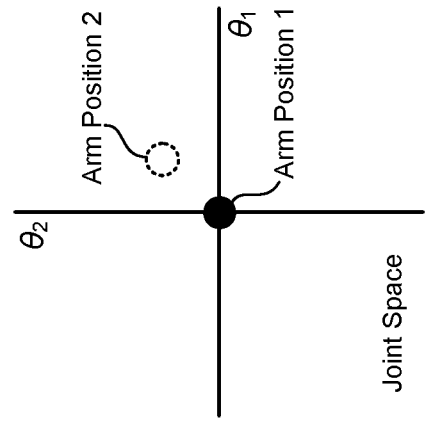
FIG. 2D is a plot showing the first position of FIG. 2A and the second position of FIG. 2B represented in a joint space.
Figure 2A:
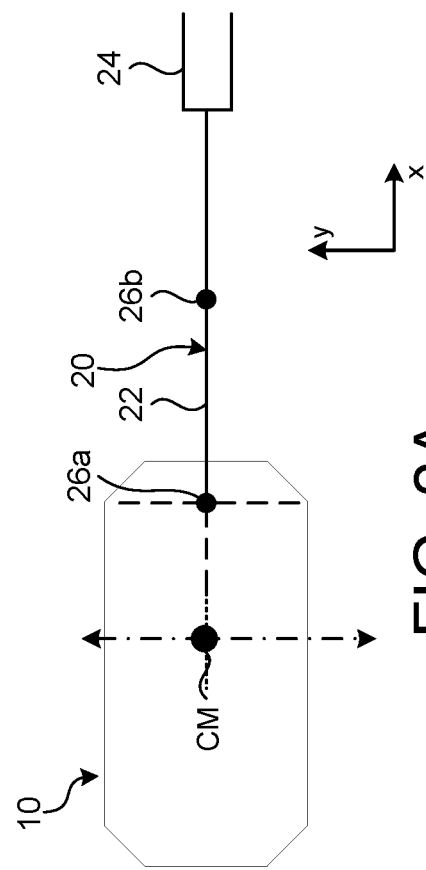
FIG. 2A is a schematic view of an example of an arm of a robot in a first position.
Figure 2B:
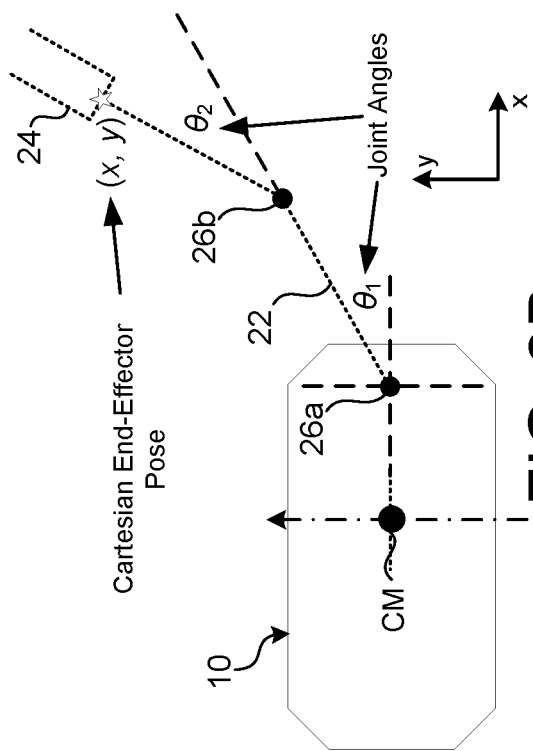
FIG. 2B is a schematic view of an example of an arm of the robot of FIG. 2A in a second position.

FIGS. 2A-2D illustrate movement of an example articulated arm 20 between a first position (FIG. 2A) and a second position (FIG. 2B), and the corresponding representations of the positions of the articulated arm 20 in a Cartesian-based workspace (FIG. 2C) and in a joint space (FIG. 2D). FIGS. 2A and 2B illustrate a generic example of a robot 10 having an articulated arm 20 including two joints 26, where an elbow joint 26a connects the articulated arm 20 to the robot body 11 and a wrist joint 26c connects a first portion 22 of the articulated arm 20 to an end effector 24 of the articulated arm 20. In FIG. 2A, the articulated arm 20 is shown in a first position where the articulated arm 20 is fully extended and the end effector 24 is aligned with a center of mass CM of the robot 10. In FIG. 2B, the articulated arm 20 is shown in a second position where the end effector 24 is moved from the first position. As shown in FIG. 2B, the pose of the end effector 24 is defined by Cartesian coordinates (x, y) and by joint angles ($\theta_1$, $\theta_2$) of the joints 26.

In FIG. 2C, the first position (FIG. 2A) and the second position (FIG. 2B) of the articulated arm 20 are represented in the two-dimensional Cartesian workspace of the articulated arm 20. When the articulated arm 20 is in the first position and is aligned with the center of mass CM, the pose of the end effector 24 is represented by the black dot on the x-axis. When the articulated arm 20 is in the second position, the pose of the end effector 24 is represented by the dashed dot having x and y coordinates corresponding to the x and y coordinates of the end effector 24 at the second position.

In FIG. 2D, the first position (FIG. 2A) and the second position (FIG. 2B) of the articulated arm 20 are represented in the two-dimensional angular joint space of the articulated arm 20. When the articulated arm 20 is in the first position and is aligned with the center of mass CM, the values of the joint angles ($\theta_1$, $\theta_2$) for the joints 26a, 26b are both zero. Accordingly, the first position of the articulated arm 20 is represented by the black dot at the origin of the joint space. When the articulated arm 20 is in the second position, both of joints 26 of the articulated arm have joint angles ($\theta_1$, $\theta_2$) greater than zero. Here, the second position is represented in the joint space by a point having coordinates corresponding to the joint angles ($\theta_1$, $\theta_2$). While a two dimensional workspace and joint space are shown here for explanation, the workspace may be a six-dimensional workspace (e.g., x, y, z, $\theta_x$, $\theta_y$, $\theta_z$) and the joint space may be an n-dimensional joint space dependent on the number of degrees of freedom of the articulated arm.

FIGS. 3A-3C illustrate an example of a situation that is addressed by the principles of the present disclosure, namely, where the end effector 24 of the articulated arm 20 of the robot 10 cannot travel directly from a start pose to a target pose due to a constraint on the articulated arm 20. In FIG. 3A, the articulable arm 20 is shown in a start pose (solid line) and in a target pose (dotted line). As shown, the start pose and the target pose of the end effector 24 are relatively close to each other within the workspace (FIG. 3B), where the end effector 24 is at the same x-position, and simply inverts the y-position (i.e., from −y to +y) about the x-axis. However, despite the close physical proximity in the workspace, the start pose and the target pose are relatively far apart within the joint space (FIG. 3C), as each of the joint angles ($\theta_1$, $\theta_2$) are inverted. As shown in FIG. 3C, the end effector 24 cannot travel directly from −θ1 to θ1 because of a joint limit JL of the shoulder joint 26a. Accordingly, an available path from the start pose to the target pose must be created within the joint space.

Figure 4A:
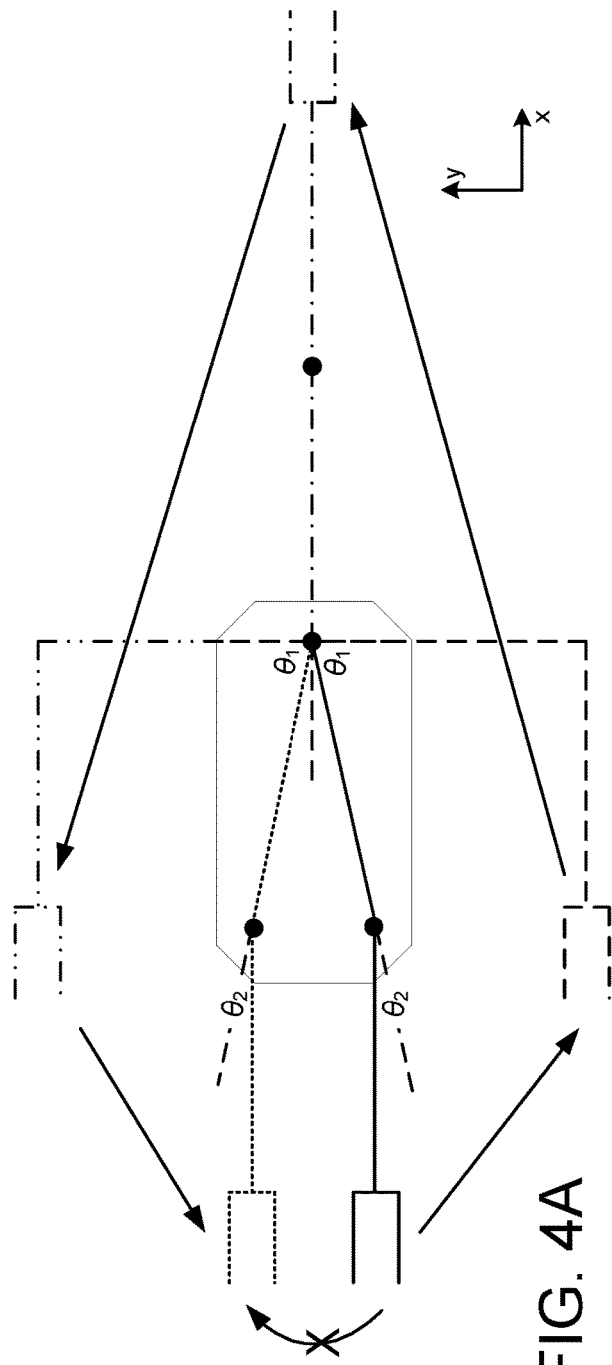
FIG. 4A is a schematic view of an example arm path of an arm of a robot from the first position to the second position of FIG. 3A, where the arm moves indirectly from the first position to the second position.
Figure 4B:
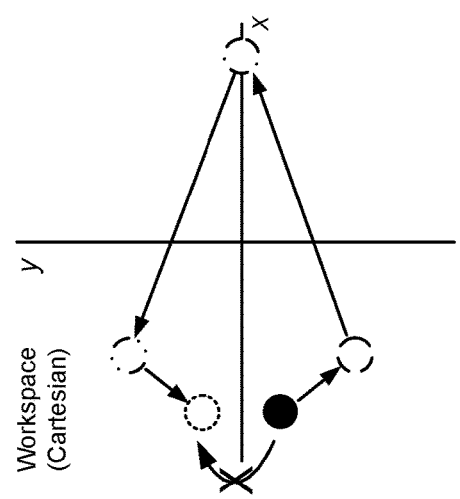
FIG. 4B is a plot showing the arm path of FIG. 4A represented in a Cartesian workspace.
Figure 4C:
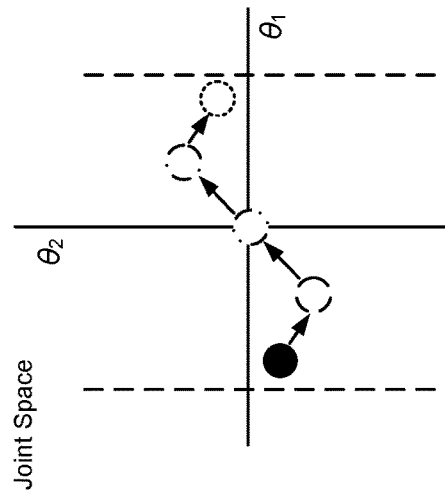
FIG. 4C is a plot showing the arm path of FIG. 4A represented in a joint space.

FIGS. 4A-4C illustrate an example solution to the situation provided in FIGS. 3A-3C, where the end effector 24 successfully moves from the start pose to the target pose through the joint space. FIG. 4A illustrates the movement of the end effector 24 from the start pose (−x, −y) to the target pose (−x, y) in an indirect, counter-clockwise motion through the workspace. FIG. 4B shows the movement of the end effector 24 from the start pose to the target pose including a series of intermediate poses in a counter-clockwise direction around the origin of the two-dimensional Cartesian workspace of the articulated arm 20. FIG. 4C depicts the start pose, the target pose, and each of the intermediate poses of the end effector 24 in the joint space, where the joint angles ($\theta_1$, $\theta_2$) corresponding to each pose are plotted as a series of nodes and form a path within the joint space between the start pose and the target pose. Thus, the path from the start pose to the target pose is defined in terms of the joint angles within the joint space, and not in terms of the physical positions of the end effector 24 within the workspace.

Figure 5:
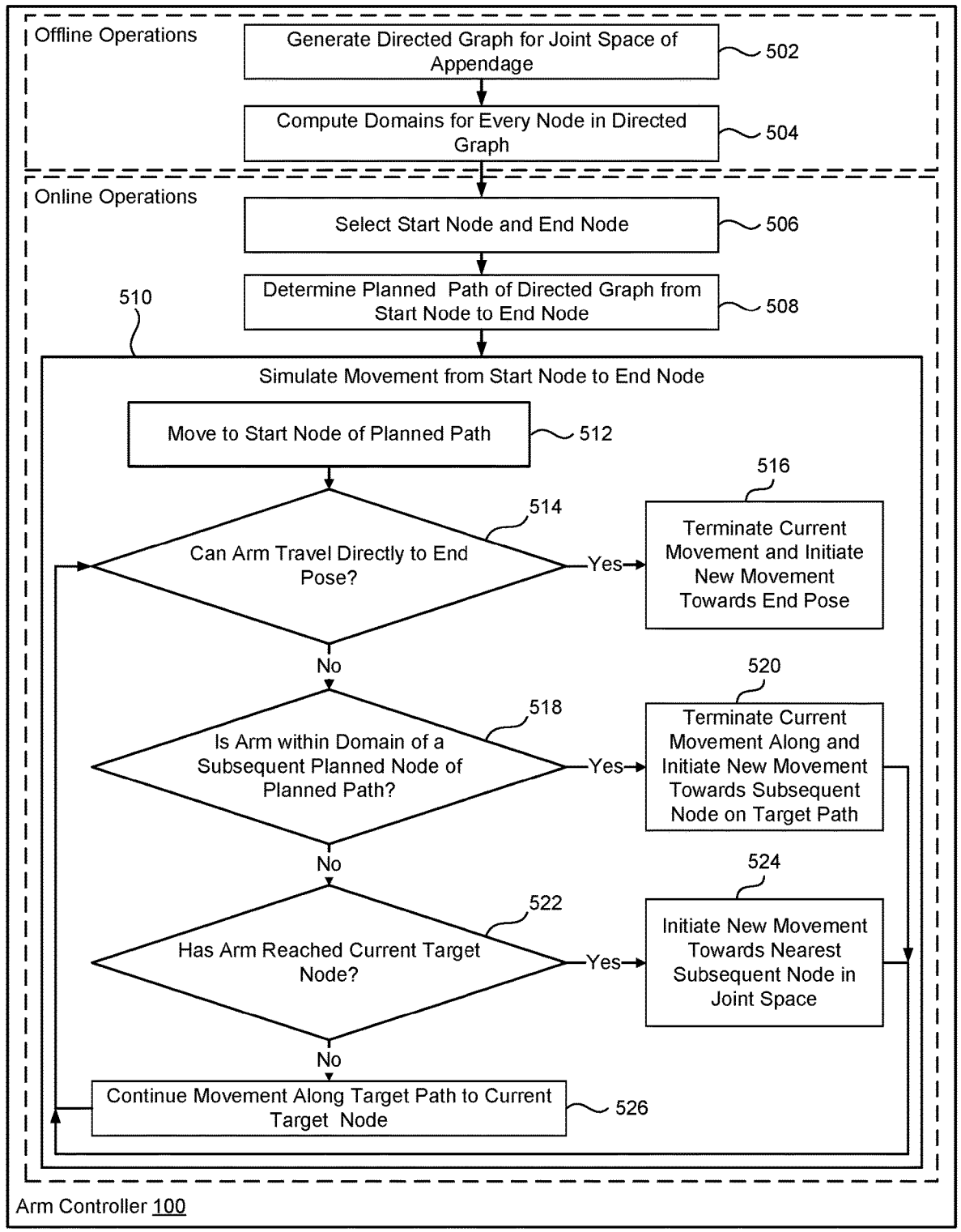
FIG. 5 is a flowchart of an example arrangement of operations for a method of planning an arm path for an arm of a robot.

Described with reference to FIGS. 6-7H, FIG. 5 shows a flowchart of example operations of the arm controller 100 for moving an articulated arm 20 from a start position 702a to a target position 702b within a joint space 700 (FIGS. 7A-7H) of the articulated arm 20. Specifically, the operations of the arm controller 100 are applied to the joint space 700 to move the articulated arm 20 from the start position 702a to a target position 702b around an obstacle 704 within the joint space 700 (FIG. 7A). The obstacle 704 may not be a physical obstacle, but may include limits/constraints to a range of motion of one or more joints 26 of the articulated arm. As shown in FIG. 5, the operations of the arm controller 100 may be divided into off-line operations and on-line operations. The arm controller 100 can perform off-line operations at any time, while the arm controller 100 typically executes the on-line operations while the robot 10 or the articulated arm 20 is in use. Accordingly, the off-line operations are not time sensitive, while the on-line operations need to be executable as fast as possible.

Figure 7A:
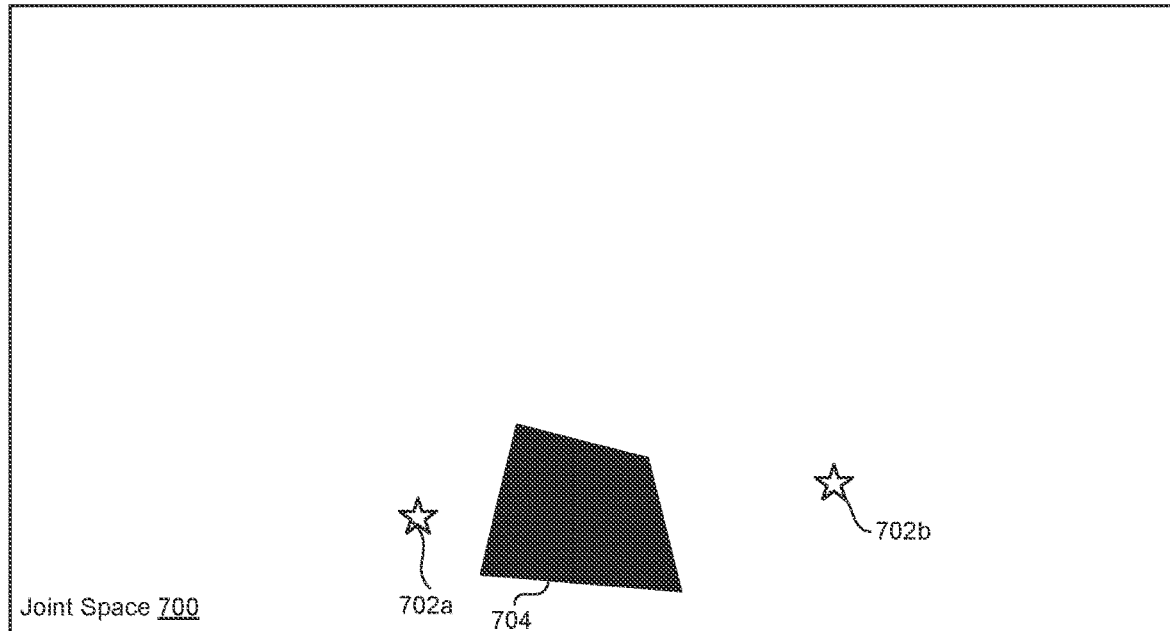
FIG. 7A is an example plot of a joint space of the arm of the robot, showing an obstacle between a start position and a target position of the arm.
Figure 7B:
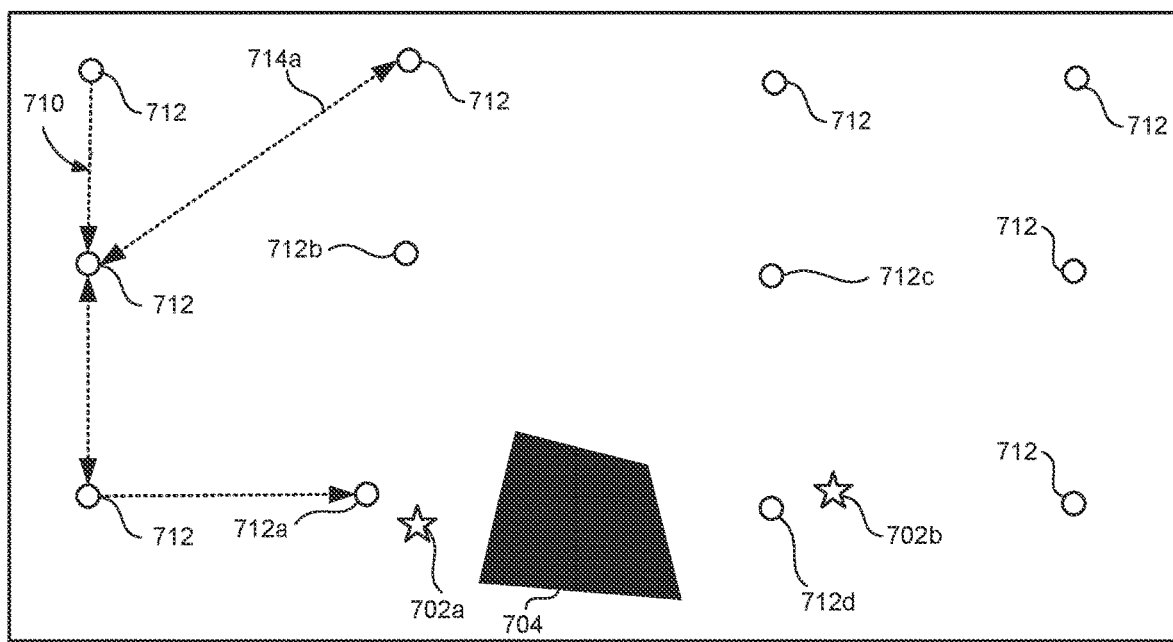
FIG. 7B is an example plot of the joint space, showing a directed graph having a plurality of nodes overlaid upon the joint space.

In a first step 502, the joint space model generator 110 of the arm controller 100 receives the environmental characteristic data 112 for the articulated arm 20 and generates the model 710 or roadmap of the joint space 700 (FIG. 7B). Here, the model 710 includes a directed graph 710 including a network of nodes 712 and edges 714. However, the model 710 may also include an undirected graph 710 including the nodes 712 and edges 714. Each of the nodes 712 of the directed graph 710 represents a joint configuration of the articulated arm 20. Pairs of the nodes (i.e., joint poses) of the directed graph 710 that the articulated arm 20 can travel directly between are connected to each other by directed edges 714, or simply, edges 714. For example, where the articulated arm 20 has two degrees of freedom, as discussed above with respect to FIGS. 2A-4D, each of the nodes 712 corresponds to a joint configuration including a first angle $\theta_1$ of a first joint 26a and a second angle $\theta_2$ of a second joint 26b.

Two nodes 712 of the joint space 700 are connected to each other by an edge 714 if the articulated arm 20 can move from one node 712 to the other node 712 without hitting an obstacle (e.g., joint limit, singularity, physical obstacle). The edges 714 may include unidirectional edges 714 and bidirectional edges 714 representing the direction that the articulated arm 20 may move between respective nodes 712. Although the nodes 712 and edges 714 are provided with respect to the joint space 700, the edges 714 may be weighted or scored based on a Cartesian distance function. For example, where an articulated arm has two joints, the edges 714 may be weighted based on a total distance traveled by the first joint and the second joint in the Cartesian workspace. Accordingly, edges 714 corresponding to shorter physical distances within the Cartesian space are assigned a smaller weight or cost (i.e., more preferred) than edges corresponding to longer physical distances.

In one example, the joint space model generator 110 of the arm controller 100 randomly generates the directed graph 710 of the joint space, which includes the nodes 712 and edges 714. In some examples, the generator 110 manually generates the directed graph 710 by overlaying the joint space 700 with a grid and assigning nodes 712 at vertices of the grid. In other examples, the generator 110 generates the directed graph 710 based on key points within the joint space 700. Thus, instead of having nodes 712 with random spacing or fixed spacing, the position and spacing of the nodes 712 may correspond to key points, such as known boundaries of the obstacle 704.

A resolution (i.e., spacing between nodes) of the directed graph 710 is based on balancing optimization of the directed graph 710 with compute time. For instance, forming the directed graph 710 with a higher resolution (i.e., closer node spacing) will provide a more optimized path from the start pose 702a to the target pose 702b, as the arm controller 100 will have more nodes 712 and edges 714 available. However, the increased resolution results in increased computing time, as more potential paths must be evaluated by the arm controller 100.

The arm controller 100 may generate and score a plurality of candidate directed graphs 710 for the joint space 700, and then select the highest scoring candidate directed graph 710 for determining a path from the start pose 702a to the target pose 702b. For each candidate directed graph 710, the arm controller 100 randomly selects respective pairs of start nodes 712 and end nodes 712 and attempts to generate a path along the edges 714 between the start node 712 and the end node 712 of each pair. The arm controller 100 then determines whether an available path existed between the start node 712 and the end node 712 of each pair, as well as the distance along the path. The candidate directed graphs 710 are then scored based on the number of successful paths and the lengths of the successful paths. Candidate directed graphs 710 having a greater number of successful paths and shorter path lengths will be selected by the arm controller 100.

Figure 7C:
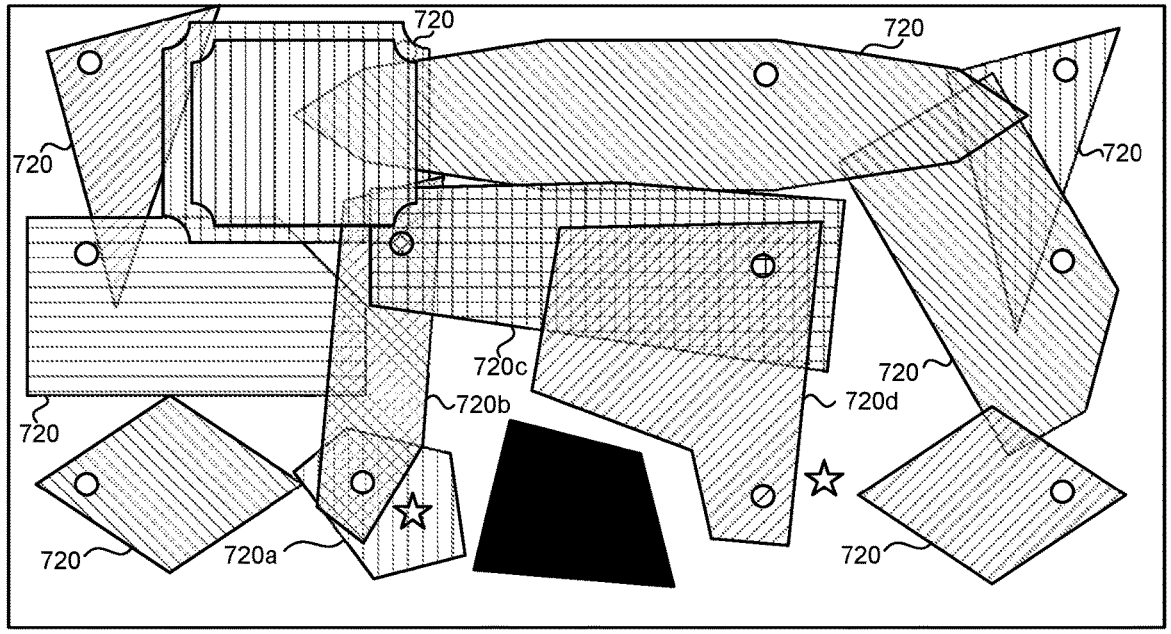
FIG. 7C is a plot of the joint space, showing outer domains for each of the nodes.

Referring again to FIG. 5 and FIG. 7C, at step 504 a domain estimator 120 of the arm controller 100 computes an estimated outer domain 720 for every node 712 in the directed graph 710 of the joint space 700. As previously mentioned, each node 712 represents a particular joint angle configuration of the articulated arm 20 (i.e., a set of joint angles ($\theta_1$, $\theta_2$) corresponding to a pose of the end effector 24). An outer domain 720 of each node 712 represents all of the joint angle configurations ($\theta_1$, $\theta_2$) from which the articulated arm 20 can travel to a respective node 712. FIG. 7C illustrates an example of the directed graph 710 where outer domains 720 have been computed for every node 712 within the joint space 700.

In some examples, the domain estimator 120 includes a classifier 124 configured to compute the outer domain 720 for each node 712 in the joint space 700. The classifier 124 may be trained on a training data set 122 of simulated joint angle configurations including successful joint angle configurations ($\theta_1$, $\theta_2$) and failed joint angle configurations ($\theta_1$, $\theta_2$). Accordingly, the training data set 122 may label the successful joint angle configurations with a first value and label the failed joint angle configurations with a different second value. For each node 712 in the joint space 700, the arm controller 100 randomly samples a plurality of joint angle configurations ($\theta_1$, $\theta_2$) of the joint space 700 and uses the trained classifier 124 to determine whether the articulated arm 20 can move from each sampled joint angle configuration ($\theta_1$, $\theta_2$) to the respective node 712. If the trained classifier 124 determines that the articulated arm 20 can travel from the sample joint angle configuration ($\theta_1$, $\theta_2$) to the respective node 712, then trained classifier 124 may assign the sample joint angle configuration a value corresponding to success, such as "1". If the articulated arm 20 cannot travel from the sample joint angle configuration ($\theta_1$, $\theta_2$) to the respective node, then the trained classifier 124 may assign sample joint angle configuration ($\theta_1$, $\theta_2$) a value corresponding to failure, such as "0".

As shown in FIG. 7C, the outer domains 720 of the nodes 712 may overlap one another. An overlap between outer domains 720 indicates a joint angle configuration ($\theta_1$, $\theta_2$) within the joint space 700 where the articulated arm 20 is capable of traveling to any one of the nodes 712 corresponding to the overlapping outer domains 720.

Figure 8A:
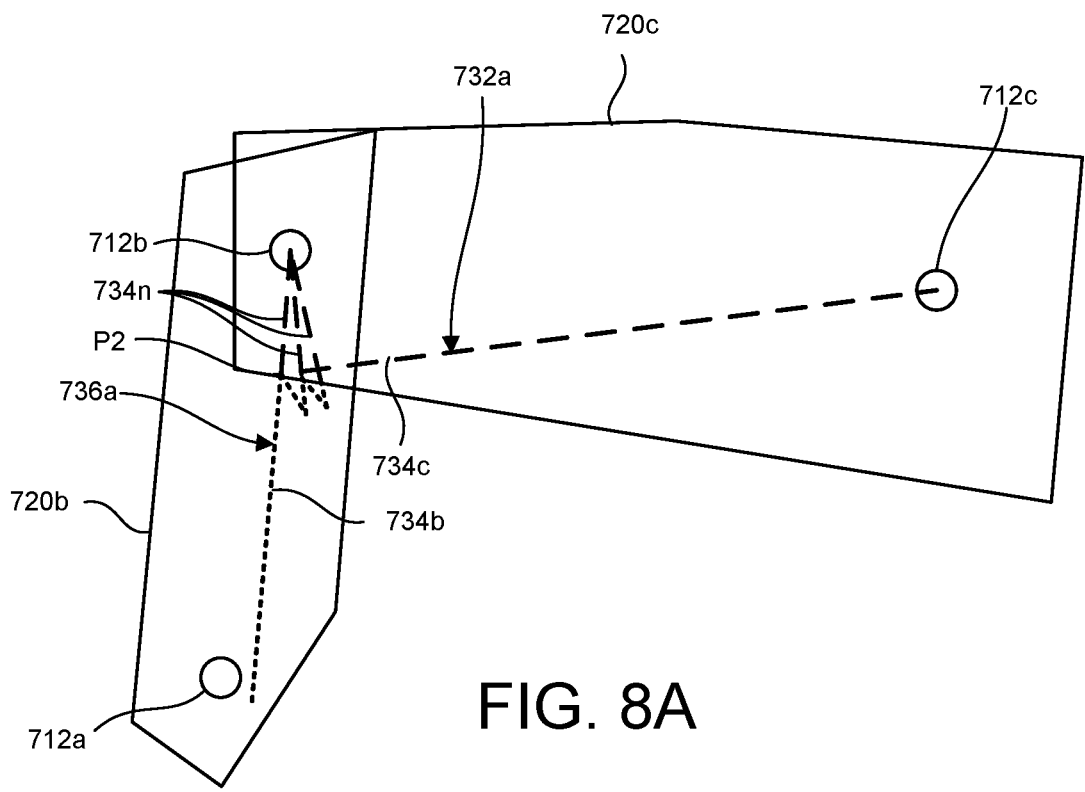
FIG. 8A is an example plot of an adjusted arm path generated using outer domains.

Because the outer domains 720 are generated by training the classifier 124 at the domain estimator 120 based on the joint angle configuration training data set 122, the resulting outer domains 720 are approximations of the actual domain of each node 712 and may include some inaccuracies. Additionally, motion uncertainties and control errors of the articulated arm 20 may cause the articulated arm 20 to move in slightly different directions than instructed. Thus, when the articulated arm 20 travels in close proximity to a boundary of an outer domains 720, the approximation of the of the outer domain 720 and the irregularities in the motion of the articulated arm 20 may lead to an oscillating motion as the arm controller 100 inadvertently enters and exits the outer domain 720, as illustrated in FIG. 8A.

Figure 7D:
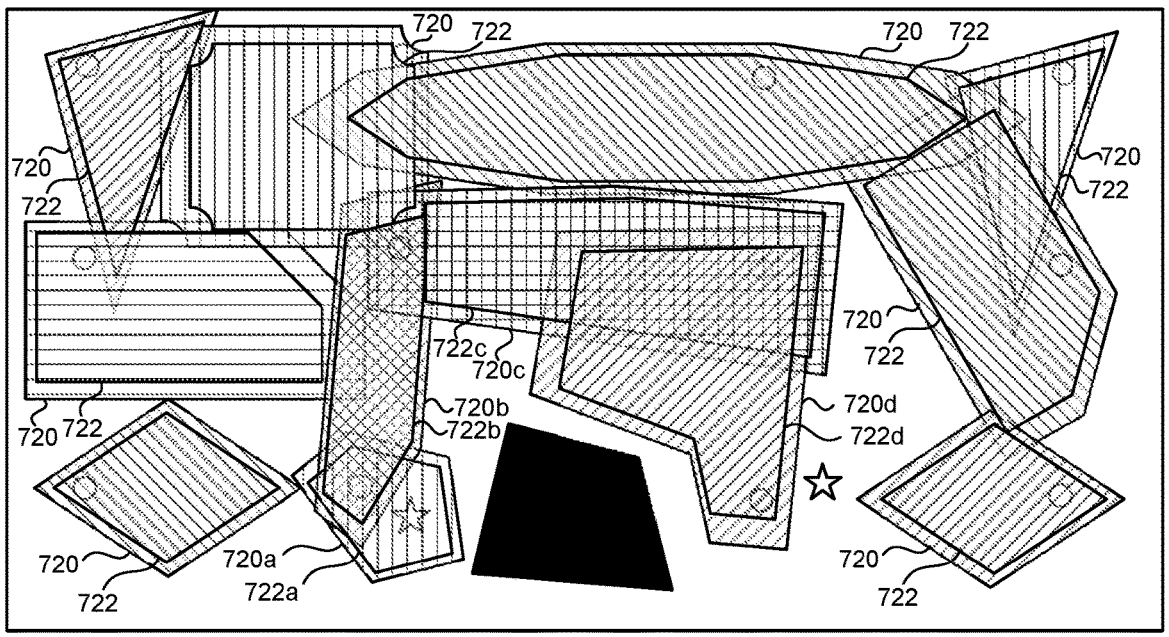
FIG. 7D is a plot of the joint space, showing inner domains for each of the nodes.
Figure 8B:
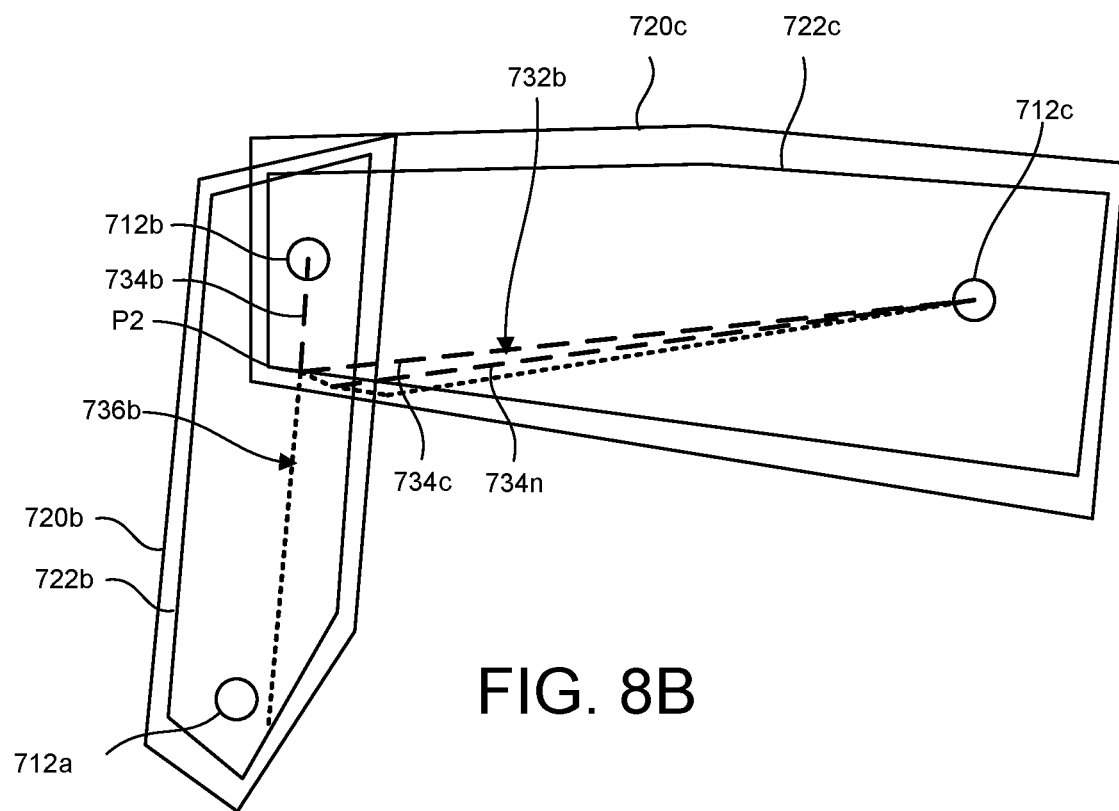
FIG. 8B is an example plot of an adjusted arm path generated using inner domains.

To accommodate for the inaccuracies of the outer domains 720 and the errors in the motion and control of the articulated arm, the domain estimator 120 may optionally be configured to compute inner domains 722 for each of the nodes 712, as illustrated at FIG. 7D. The inner domains 722 are subsets of the outer domains 720 where an outer boundary of the inner domain 722 is inwardly offset from the boundary of the corresponding outer domain 720 by a threshold distance. As described in greater detail below, the threshold distances between boundaries of the inner domains 722 and the boundaries of the respective outer domains 720 provide buffer regions for the arm controller 100 as the arm controller 100 creates edges 714 between nodes 712. This buffer accommodates inaccuracies in the estimated outer domains 720 and motion and control errors of the articulated arm 20, as illustrated in FIG. 8B.

Figure 7E:
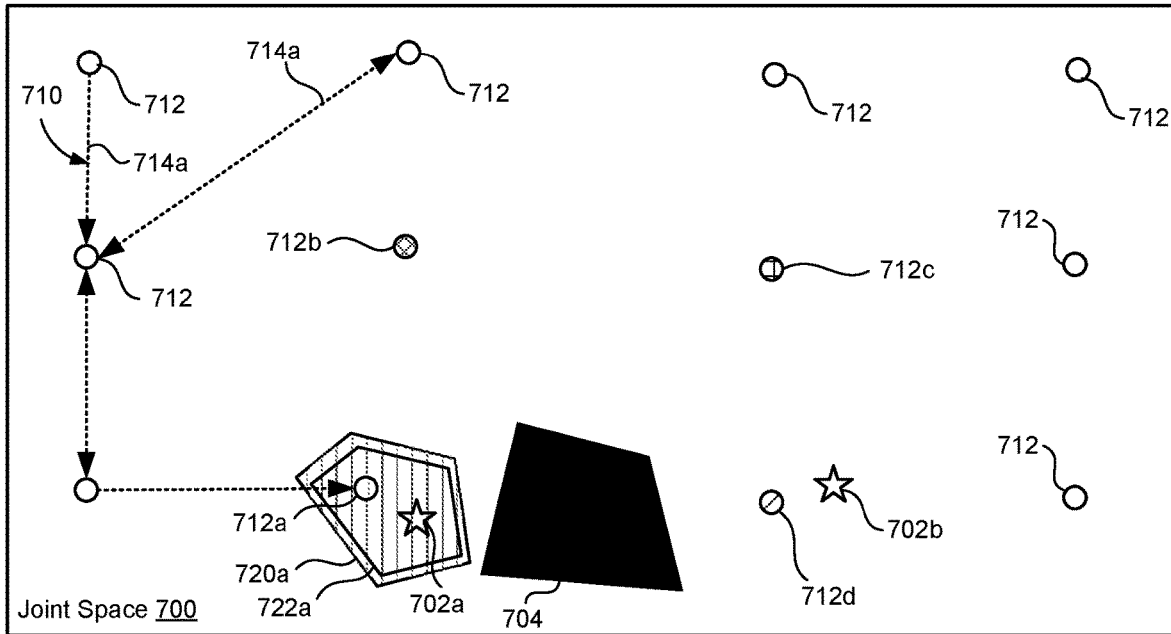
FIG. 7E is an example plot of the joint space, showing a selected start node.

With continued reference to FIG. 5, at step 506 the path planner 130 of the arm controller 100 selects a start node 712a that is closest to the start pose 702a in the joint space 700 and an end node 712d that is closest to the target pose 702b in the joint space 700. In some instances, the path planner 130 utilizes a k-d tree to conduct a nearest-neighbor search for the start node 712a and the end node 712d. In selecting the start node 712a, the path planner 130 evaluates the domains 720, 722 of the start node 712a candidates to determine whether the start pose 702a lies within a domain 720, 722 for any one or more of the other nodes 712 of the joint space 700. When the start pose 702a lies within a domain 720, 722 for a node 712, that node 712 is retained as a potential start node 712a by the path planner 130, while the remaining nodes 712 are disqualified as potential start nodes 712a. In instances where the start pose 702a does not lie within a domain of a node 712, then the path planner 130 selects the closest node 712 in the joint space 700 as the start node 712a. As shown in the example of FIG. 7E, the start pose 702a lies within the outer domain 720a of the first node 712a, resulting in the path planner 130 selecting the first node 712a as the start node.

Figure 7F:
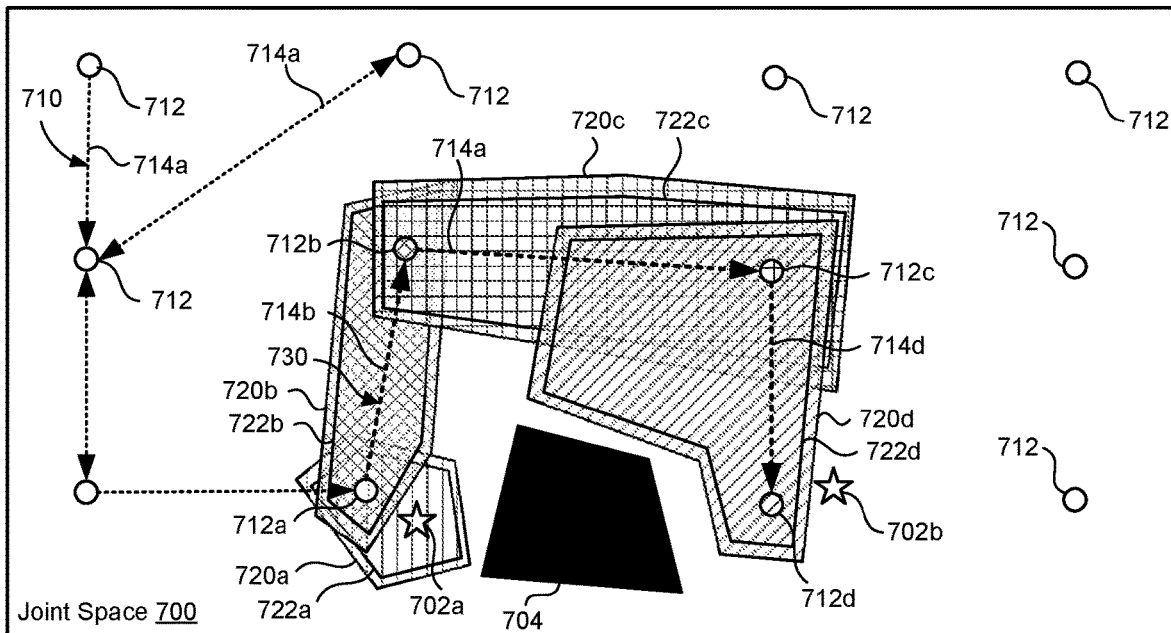
FIG. 7F is an example plot of the joint space, showing a planned arm path.

Referring to FIGS. 5 and 7F, once the path planner 130 selects the start node 712a and the end node 712d, the path planner 130 determines, at step 508, a planned path 730 along the nodes 712 of the directed graph 710 from the start node 712a to the end node 712d. In the illustrated example, the planned path 730 includes four planned nodes 712a-712d and three corresponding planned edges 714a-714d connecting subsequent ones of the planned nodes 712a-712d. Here, the planned nodes 712a-712d include the start node 712a, a second node 712b, a third node 712c, and the end node 712d. The planned edges 714a-714c include a first planned edge 714a extending from the start node 712a to the second node 712b, a second planned edge 714b extending from the second planned node 712b to the third planned node 712c, and a third planned edge 714c extending from the third planned node 712c to the end node 712d. Each of the planned edges 714a-714c may be alternatively referred to as a planned movement 714a-714c along the planned path 730.

As discussed above, the resolution of the directed graph 710 may be selected to limit the number of nodes 712 within the joint space 700 such that the path planner 130 can quickly evaluate and select a planned path 730 from a plurality of available candidate planned paths 730. The path planner 130 determines the target planned path 730 by simulating all of the possible planned paths from the start node 712a to the end node 712b, and then selecting the candidate planned path 730 having the shortest length in the Cartesian workspace based on the weighted values of the edges 714 of the candidate planned path 730, as discussed above.

The arm controller 100 may also include a path evaluator 140 configured to evaluate the potential planned paths 730 by scoring the nodes 712 of the planned path 730 based on the number of domains 720 that each node 712 lies in. For example, nodes lying within two or more overlapping domains may be given greater weight than nodes 712 lying in a single domain 720. Here, the presence of two or more overlapping domains 720 at a node 712 indicates that the articulated arm 20 can move directly between the node 712 associated with the first domain 720 and the node 712 associated with the second domain 720.

Figure 7G:
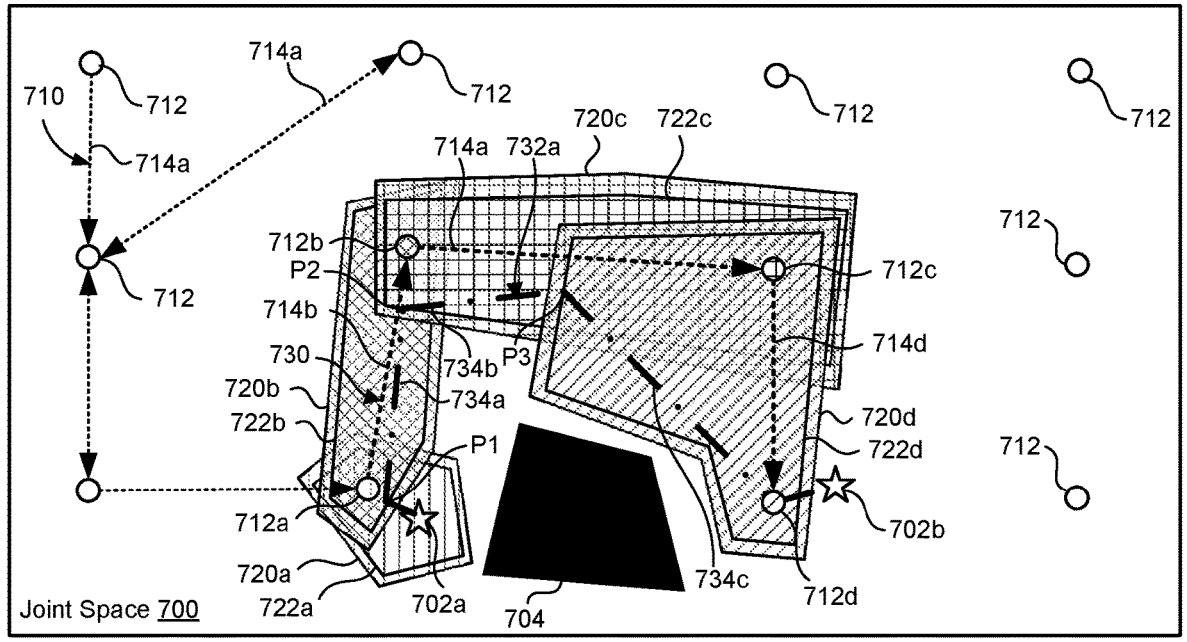
FIG. 7G is an example plot of the joint space, showing a first example of an adjusted arm path.
Figure 7H:
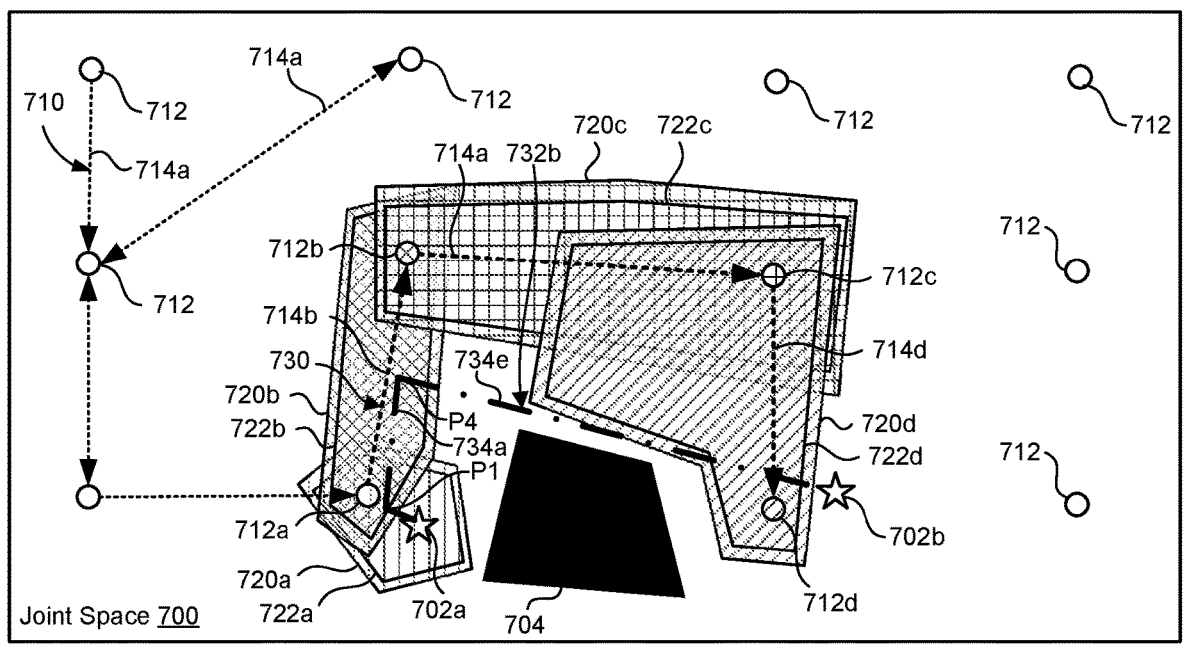
FIG. 7H is an example plot of the joint space, showing a second example of an adjusted arm path.

At step 510, the path evaluator 140 executes a series of sub-steps 512-526 to evaluate the planned path 730 and determine whether a path adjuster 150 at the arm controller 100 can adjust the planned path 730 by interrupting a current movement and initiating a new movement directly to the target pose 702b or to a subsequent planned node 712b-712d along the planned path 730. FIGS. 7G and 7H, which are explained in greater detail below, illustrate two examples of the path adjuster 150 generating an adjusted path 732, 732a, 732b according to the simulation step 510.

At step 512, the path evaluator 140 of the arm controller 100 evaluates the joint angle configuration ($\theta_1$, $\theta_2$) associated with the start pose 702a to determine whether the start pose 702a is within a domain 720a, 722a of the start node 712a. When the start pose 702a is within the domain 720a, 722a of the start node 712a, as shown in the example of FIG.

7A, the arm controller 100 assigns the start node 712a as the current target node 712 and instructs the articulated arm 20 to move to the joint angle configuration (01a. 02a) associated with the start node 712a.

At step 514, as the articulated arm 20 moves along the planned path 730, the path evaluator 140 iteratively evaluates a current joint angle configuration 142 of the articulated arm 20 to determine whether the articulated arm 20 can travel directly to the target pose 702b from the current joint angle configuration 142. When the path evaluator 140 determines that the articulated arm 20 can travel directly to the target pose 702b, then the path evaluator 140 sends path adjustment instructions 152 to the path adjuster 150 to terminate the current movement and initiate an adjusted movement directly to the target pose 702b at step 516.

When the path evaluator 140 determines that the articulated arm 20 cannot travel directly to the target pose 702b at step 514, the path evaluator 140 proceeds to step 518. At step 518, the path evaluator 140 determines whether the current joint angle configuration 142 lies within a domain 720b-720d of a subsequent one of the planned nodes 712b-712d. When the path evaluator 140 determines that the current joint angle configuration 142 is within the domain of a subsequent one of the planned nodes 712b-712d, the path evaluator 140 instructs the path adjuster 150 to terminate the current movement and initiate a new movement towards the subsequent planned node 712b-712d corresponding to the domain, and the path evaluator returns to step 514 to begin iteratively evaluating movements along the adjusted path 732a.

When the estimator 120 determines that the current joint angle configuration 142 does not lie within a domain of a subsequent planned node 712b-712d, the path evaluator 140 proceeds to step 522 to determine whether the articulated arm 20 has reached the current target node 712 of the planned nodes 712a-712d. When the articulated arm 20 reaches a target node 712 of the planned path 730, the arm controller 100 initiates a new movement to the subsequent planned node 712b-712d in the planned path 730, and the arm controller 100 returns to step 514 to begin evaluating the movement 714a-714c to the subsequent planned node 712b-712d.

When the path evaluator 140 determines that the articulated arm 20 has not reached the current target node 712a-712d, then arm controller 100 instructs the articulated arm 20 to continue moving towards the current target node 712a-712d and the path evaluator 140 returns to step 514 to begin another iteration of evaluating the movement of the articulated arm 20. The arm controller 100 repeats sub-steps 514-526 until the evaluator 140 identifies a current joint angle configuration 142 from which the articulated arm 20 can travel directly to the target pose 702b.

As discussed above, FIG. 7G illustrates an example of the simulation step 510 where the arm controller 100 prematurely terminates each of a series of movements towards respective ones of the planned nodes 712a-712d to initiate adjusted movements towards subsequent ones of the nodes 712b-712d. For the sake of clarity, this example assumes that the articulated arm 20 can never travel directly to the target pose 702b from the planned path 730. Accordingly, the response at step 514 will always be "no" in this example.

Initially, the articulated arm 20 moves from the start pose 702a towards the start node 712a of the planned path 730. As the articulated arm 20 moves towards the start node 712a, the path evaluator 140 continuously evaluates the current joint angle configuration 142 to determine whether the articulated arm is within a domain 720, 722 of a subsequent one of the planned nodes 712b-712d. As shown in FIG. 7G, at point P1, the path evaluator 140 determines that the current joint angle configuration 142 is within the inner domain 722b of the second node 712b. Here, the path evaluator 140 instructs that path adjuster 150 to terminate the movement towards the start node 712a and initiate a new movement from the point P1 towards the second node 712b along a first adjusted edge 734a.

As the articulated arm 20 moves along the first adjusted edge 734a towards the second node 712b, the path evaluator 140 continuously evaluates the current joint angle configuration 142 to determine whether the articulated arm 20 is within a domain 720c-720d. 722c-722d of a subsequent one of the planned nodes 712c-712d. At point P2, the evaluator 140 determines that the current joint angle configuration 142 of the articulated arm 20 is within the inner domain 722c of the third planned node 712c and instructs the path adjuster 150 to terminate the current movement of the articulated arm 20 along the first adjusted edge 734c and initiate a new movement toward the third planned node 712c along a second adjusted edge 734b.

The arm controller 100 repeats this sequence at point P3, where the movement along the second adjusted edge 734b is terminated when path evaluator 140 determines that the current joint angle configuration 142 of the articulated arm 20 is within the inner domain 722d of the end node 712d. From point P3, the path adjuster 150 initiates a new movement towards the end note 712d along a third adjusted edge 734c. As shown in FIG. 7G, the articulated arm 20 continues along the third adjusted edge 734c of the adjusted path 732a until it reaches the end node 712d of the planned path 730 (step 526). From the end node 712d, the path evaluator reiterates the sub-steps 514, 518, 522 and determines that the articulated arm 20 can travel directly from the end node 712d to the target pose 702b.

As set forth above, the arm controller 100 may generate and evaluate inner domains 722a-722d associated with each planned node 712a-712c instead of the outer domains 720a-720d. The benefits of the inner domains 722a-722d are illustrated by the examples of the adjusted path 732a shown in FIGS. 8A and 8B.

FIG. 8A shows an example of the adjusted path 732a generated using only outer domains 720. Here, an actual path 736a of the articulated arm 20 travels along the second outer domain 720b towards the second planned node 712a until the articulated arm 20 intersects the boundary of the third outer domain 720c of the third planned node 712c. The arm controller 100 then determines that the articulated arm 20 is within the third outer domain 720c and instructs the articulated arm 20 to initiate a new movement 734c towards the third planned node 712c. However, due to inaccuracies in the estimated boundary of the third outer domain 720c, motion uncertainties of the articulated arm 20, and/or control errors, the path evaluator 140 may determine that the actual path 736a of articulated arm 20 repeatedly exits the estimated boundary of the third outer domain 720c. Each time the path evaluator 140 determines that the actual path 736a of the articulate arm 20 is outside of the third outer domain 720c, but within the second outer domain 720b, the arm controller 100 instructs the articulated arm 20 to initiate a new movement 734n back towards the second planned node 712b until the path evaluator 140 determines that the articulated arm 20 has reentered the third outer domain 720c. Once the path evaluator 140 determines that the articulated arm 20 is back within the third outer domain 720c, the arm controller 100 again instructs the articulated arm 20 to move towards the third planned node 712 along the edge 734c.

This process repeats every time that the path evaluator 140 determines that the actual path 736a of articulated arm 20 has exited the third outer domain 720c, resulting in an oscillated actual path 736a along the boundaries of the outer domains 720.

FIG. 8B shows an example of the path adjuster 150 generating the adjusted path 732b using the inner domains 722. Here, the path evaluator 140 is configured such that it only determines that the articulated arm 20 has entered a domain when the articulated arm 20 is within an inner domain 722. In the illustrated example, the articulated arm 20 travels along the first adjusted edge 734a until the articulated arm 20 intersects the boundary of the third inner domain 722c. The arm controller 100 then determines that the actual path 736b of the articulated arm 20 is within the third inner domain 722c and instructs the articulated arm 20 to initiate a new movement 734c towards the third planned node 712c. Unlike the example of FIG. 8A, the inaccuracies of the third outer domain 720c and/or errors of the articulated arm 20 are accommodated by the buffer between the third inner domain 722c and the third outer domain 720c. As shown, the actual path 736b of the articulated arm 20 remains within the third outer domain 720c after the first movement, at which point the arm controller 100 reevaluates the current joint angle configuration 142 of the articulated arm 20 and creates an updated or adjusted movement 734n towards the third planned node 712c. Thus, instead of cycling between movements towards the second planned node 712b and the third planned node 712c when the articulated arm 20 exits and enters the outer domain 720, the path evaluator 140 and the path adjuster 150 cooperate to continuously update the adjusted path 732a to move the articulated arm 20 towards the third planned node 712c, resulting in increased stability of the arm controller 100.

FIG. 7H shows another example of the simulation step 510 where the arm controller 100 prematurely terminates a movement 734b towards one of the planned nodes 712b to initiate a new movement 734e directly towards the target pose 702b. Here, the articulated arm 20 moves from the start pose 702a towards the start node 712a in the same manner as described above with respect to the example of FIG. 7G. Likewise, at point P1 the arm controller 100 terminates an initial movement towards the start node 712a and initiates a movement towards the second planned node 712b along the first adjusted edge 734a. However, unlike the example of FIG. 7G, where the articulated arm 20 continues along the first adjusted edge 734a until the current joint angle configuration 142 is within the inner domain 722c of the third planned node 712c, in the example of FIG. 7H the movement of the articulated arm 20 towards the second planned node 712b is terminated prior to the articulated arm 20 entering the third planned domain 720c. 722c of the third planned node 712c. Instead, at point P4 the path evaluator 140 executes sub-step 514 of the simulation 510 and determines that the articulated arm 20 can travel directly do the target pose 702b. Here, the path evaluator 140 instructs the path adjuster 150 via a path adjustment instruction 152 to initiate a new movement directly from point P4 to the target pose 702c along the adjusted edge 734c.

Figure 9:
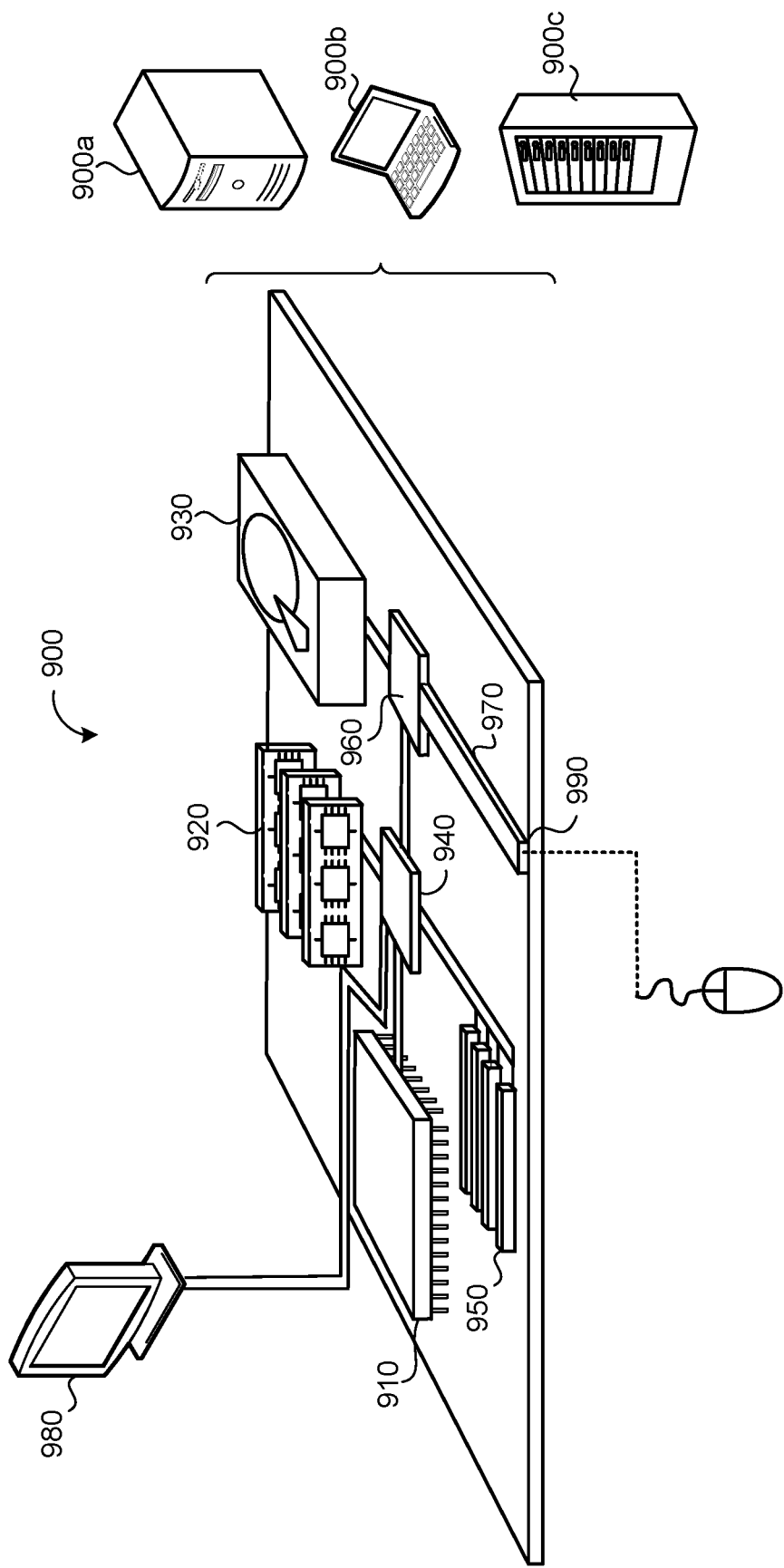
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 990, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900*a* or multiple times in a group of such servers 900*a*, as a laptop computer 900*b*, or as part of a rack server system 900*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method of robotic arm control, the method comprising:
    generating, by data processing hardware, a planned path of an articulated arm of a robot along a series of nodes from a start node associated with a start pose of the articulated arm to an end node associated with a target pose of the articulated arm;
    initiating, by the data processing hardware, a movement of the articulated arm towards a current target node of the series of nodes, the current target node between the start node and the end node;
    determining, by the data processing hardware, that the articulated arm can travel directly to the target pose;
    terminating, by the data processing hardware, the movement of the articulated arm towards the current target node; and
    initiating, by the data processing hardware, a movement of the articulated arm towards the target pose.

2. The method of claim 1, further comprising computing, by the data processing hardware, an outer domain for each of the series of nodes.

3. The method of claim 2, wherein determining that the articulated arm can travel directly to the target pose comprises determining that the articulated arm is within the outer domain of the end node.

4. The method of claim 2, further comprising computing, by the data processing hardware, an inner domain for each outer domain.

5. The method of claim 4, wherein computing the inner domain comprises offsetting a boundary of the inner domain from a boundary of the corresponding outer domain by a threshold distance.

6. The method of claim 1, further comprising generating, by the data processing hardware, a plurality of candidate planned paths from the start node to the end node, each candidate planned path comprising a corresponding series of movements of the articulated arm.

7. The method of claim 6, further comprising selecting, by the data processing hardware, the planned path from amongst the plurality of candidate planned paths.

8. The method of claim 1, further comprising moving the articulated arm directly toward the target pose after terminating the movement of the articulated arm towards the current target node.

9. The method of claim 1, further comprising training a classifier using a training data set of joint angle configurations including a plurality of successful joint angle configurations and a plurality of failed joint angle configurations, wherein determining that the articulated arm can travel directly to the target pose comprises using the classifier.

10. A robot comprising:
an articulated arm; and
a control system in communication with the articulated arm, the control system comprising data processing hardware configured to:
generate a planned path of the articulated arm along a series of nodes from a start node associated with a start pose of the articulated arm to an end node associated with a target pose of the articulated arm;
initiate a movement of the articulated arm towards a current target node of the series of nodes, the current target node between the start node and the end node;
determine that the articulated arm can travel directly to the target pose;
terminate the movement of the articulated arm towards the current target node; and
initiate a movement of the articulated arm towards the target pose.

11. The robot of claim 10, wherein the data processing hardware is further configured to compute an outer domain for each of the series of nodes.

12. The robot of claim 11, wherein the data processing hardware is further configured to determine that the articulated arm can travel directly to the target pose by determining that the articulated arm is within the outer domain of the end node.

13. The robot of claim 11, wherein the data processing hardware is further configured to compute an inner domain for each outer domain.

14. The robot of claim 13, wherein the data processing hardware is further configured to compute the inner domain by offsetting a boundary of the inner domain from a boundary of the corresponding outer domain by a threshold distance.

15. The robot of claim 10, wherein the data processing hardware is further configured to generate a plurality of candidate planned paths from the start node to the end node, each candidate planned path comprising a corresponding series of movements of the articulated arm.

16. The robot of claim 15, wherein the data processing hardware is further configured to select the planned path from amongst the plurality of candidate planned paths.

17. The robot of claim 10, wherein the data processing hardware is further configured to move the articulated arm directly toward the target pose after terminating the movement of the articulated arm towards the current target node.

18. The robot of claim 10, wherein the data processing hardware is further configured to train a classifier using a training data set of joint angle configurations including a plurality of successful joint angle configurations and a plurality of failed joint angle configurations, and to determine that the articulated arm can travel directly to the target pose using the classifier.

19. A computer program product comprising a non-transitory computer readable medium storing instructions that when executed by data processing hardware, cause the data processing hardware to:

generate a planned path of an articulated arm of a robot along a series of nodes from a start node associated with a start pose of the articulated arm to an end node associated with a target pose of the articulated arm;

initiate a movement of the articulated arm towards a current target node of the series of nodes, the current target node between the start node and the end node;

determine that the articulated arm can travel directly to the target pose;

terminate the movement of the articulated arm towards the current target node; and initiate a movement of the articulated arm towards the target pose.

20. The computer program product of claim 19, wherein the instructions further cause the data processing hardware to compute an outer domain for each of the series of nodes, and an inner domain for each outer domain.

* * * * *